United States Patent
Whiteside

(10) Patent No.: US 7,624,758 B2
(45) Date of Patent: Dec. 1, 2009

(54) FLUID FLOW CONTROLLER

(75) Inventor: Richard Eric Whiteside, Derbyshire (GB)

(73) Assignee: Land Instruments International Ltd (GB)

( * ) Notice: Subject to any disclaimer, the term of this patent is extended or adjusted under 35 U.S.C. 154(b) by 405 days.

(21) Appl. No.: 11/538,159

(22) Filed: Oct. 3, 2006

(65) Prior Publication Data
US 2007/0104244 A1 May 10, 2007

(30) Foreign Application Priority Data
Oct. 28, 2005 (GB) .................................. 0522002.5

(51) Int. Cl.
*G01N 25/02* (2006.01)
(52) U.S. Cl. ..................... 137/613; 137/505; 374/28
(58) Field of Classification Search ................. 137/613, 137/505, 505.25; 374/16, 21, 24, 25, 27, 374/28
See application file for complete search history.

(56) References Cited

U.S. PATENT DOCUMENTS

| | | | |
|---|---|---|---|
| 3,958,599 A * | 5/1976 | Sheldon et al. | 137/613 |
| 4,179,917 A | 12/1979 | Sheldon et al. | |
| 6,071,481 A * | 6/2000 | Mathews et al. | 422/170 |
| 6,422,257 B1 * | 7/2002 | Baker, Jr. | 137/557 |

FOREIGN PATENT DOCUMENTS

| | | |
|---|---|---|
| EP | 0 551 594 A1 | 7/1993 |
| EP | 0 584 920 A1 | 3/1994 |
| WO | 03/071265 A1 | 8/2003 |

OTHER PUBLICATIONS

Search Report dated Jan. 24, 2007 which issued in connection with corresponding European Application No. 06076795.1.

* cited by examiner

*Primary Examiner*—Kevin L Lee
(74) *Attorney, Agent, or Firm*—Trexler, Bushnell, Giangiorgi, Blackstone & Marr, Ltd

(57) ABSTRACT

A fluid flow controller (1) comprises a variable aperture flow control valve (5) having an inlet to receive fluid from a supply source and an outlet to deliver fluid along a conduit (6). Downstream of the valve (5) is a back-pressure regulator (8), which in turn delivers fluid to an outlet (9), whilst a permanently open orifice (11) is connected to the conduit (6) upstream of the regulator and provided with an exhaust outlet (12), the characteristics of the valve (5), regulator (8) and orifice (11) being so selected that upon a slight opening of the valve (5), the regulator (8) maintains a closed condition, while further opening of the valve (5) raises the fluid pressure at the regulator (8) which commences opening, to provide a continuous exhaust flow at the exhaust outlet (12), to extend the satisfactory operating range of the flow control valve (5) down to very low flow rates. The controller (1) is suitable for use with a sulphuric acid dewpoint monitor.

9 Claims, 3 Drawing Sheets

FLUID FLOW CONTROLLER

This application claims the benefit of British application Serial No. 0522002.5 filed Oct. 10, 2005.

FIELD OF THE INVENTION

This invention relates to a fluid flow controller for the precise control of fluid (air, gas or liquid) flow, with a very wide range of operation, typically where the ratio of the required maximum flow rate to the required minimum flow rate exceeds 50:1, and to a flow controller and dewpoint monitor combination.

BACKGROUND OF THE INVENTION

Known fluid flow controllers incorporate a needle valve movable between completely closed, and partially open positions, but if the needle valve is only open a small amount or is nearly closed, the resulting backlash or non-linearity affects the flow rate to, and at, the delivery outlet.

In some industrial processes materials condense out of a gas if the temperature falls below a certain value—the 'dewpoint'.

An example is sulphuric acid, which condenses out of flue gas deriving from combustion of fuels containing sulphur. This can cause serious corrosion of the plant metalwork, and consequently it is important to know the dewpoint and to maintain the flue gas above this temperature.

In other processes materials (liquids or solids) may condense out of the gas and cause blockages in the process.

A dewpoint monitor is conventionally constructed by inserting into a flue gas for example a surface whose temperature is both controllable and measured. The surface temperature is initially set at a high value and slowly reduced. The surface temperature at the onset of condensation gives the dewpoint. The onset of condensation may be detected by various means, for example measuring the electrical conductivity between two electrodes embedded in the surface.

More sophisticated control algorithms may be used—for example controlling the temperature to maintain a fixed conductivity value. This maintains a fixed film thickness of the condensate on the surface. In this state the film is in equilibrium with the gas, i.e. the rate of condensation equals the rate of evaporation. The measured surface temperature then gives the equilibrium temperature, which is a true measure of dewpoint.

The dewpoint value may depend on the concentration of condensable material in the gas. Its measurement may therefore be used as a means to estimate this concentration. This has value in process control and pollution prevention.

More sophisticated algorithms may be used to estimate concentration (i.e. rather than a direct measurement of dewpoint). For example one may cycle the surface temperature above and below the dewpoint and record both the temperature cycle and the conductivity cycle. The relationship between these may differ depending on concentration. In simple terms, in the cooling part of the cycle a higher concentration gives a faster rate of deposition, which gives a thicker film, which then requires a higher temperature in the heating part of the cycle to remove the film and reduce the conductivity to zero, this 'conductivity' being taken as the indicator of film thickness, but other means such as optical means, could be employed to indicate film thickness.

In all the above there is a requirement for precise control of a surface temperature. This is conveniently achieved by means of a controllable air flow. The surface receives heat from the process (e.g. flue gas) and heat is removed by a cooling air flow. This cooling air flow must be very precisely controllable over a wide range of flow rates. The flow controller invention is of value in delivering cooling air to a dewpoint monitor.

OBJECT OF THE INVENTION

A basic object of the invention is the provision of a flow controller incorporating a flow control valve which avoids backlash and non-linearity in a nearly closed condition, and to a combined flow controller and dewpoint monitor.

SUMMARY OF THE INVENTION

According to the present invention, there is provided a fluid flow controller comprising a variable aperture flow control valve having an inlet to receive fluid from a supply source and an outlet to deliver fluid along a conduit wherein downstream of the flow control valve is a back-pressure regulator, which in turn delivers fluid to an outlet, and a permanently open orifice is connected to the conduit upstream of the back-pressure regulator and provided with an exhaust outlet, the characteristics of the flow control valve, the back-pressure regulator and the orifice being so selected that upon a slight opening of the flow control valve the back-pressure regulator maintains a closed condition, while further opening of the flow control valve raises the fluid pressure at the back-pressure regulator which commences opening, to provide a continuous exhaust flow at the exhaust outlet, to extend the satisfactory operating range of the flow control valve down to very low flow rates.

ADVANTAGES OF THE INVENTION

The flow controller in accordance with the invention may be used to control the cooling air supply to the probe of a dewpoint meter to detect the presence of a condensate such as sulphuric acid, ammonium bisulphate etc. Precise control of air flow, over the range 0.1 to 350 L/min, is achievable.

PREFERRED OR OPTIONAL FEATURES OF THE INVENTION

Upstream of the control valve is a pressure regulator.
The flow control valve is a needle valve.
The back-pressure regulator is a relief valve.
The flow controller is combined with a dewpoint monitor.
The dewpoint monitor monitors film presence by means of conductivity.
The dewpoint monitor comprises a glass thimble with embedded electrode and thermocouple, the thimble having an end wall to one side of which cooled air is delivered by the flow controller.
The electrode is a circular, platinum electrode.
The thermocouple is a platinum/platinum 13% rhodium thermocouple.

DETAILED DESCRIPTION OF THE DRAWINGS

Figure 1:
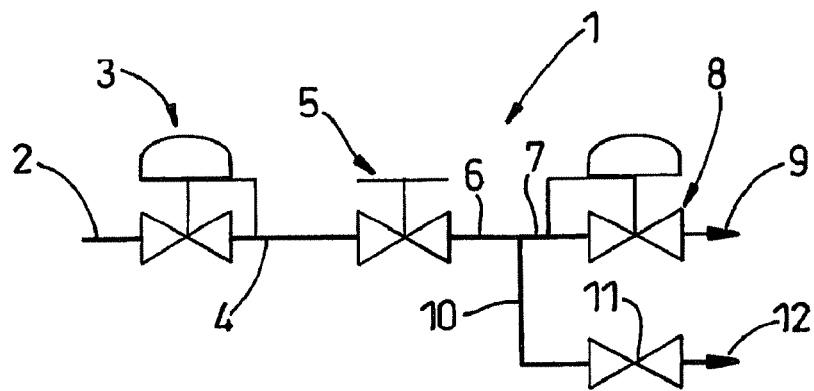
FIG. 1 illustrates diagrammatically a flow controller in accordance with the invention.

In all Figures, like reference numerals are used for like components.

FIG. 1 shows the configuration of components which compose a flow controller 1 in accordance with the invention. Air or other fluid is applied under pressure via an inlet conduit 2 to a pressure regulator 3 which ensures a constant fluid pressure via conduit 4 to a downstream flow control valve 5 in the form of a needle valve. An outlet conduit 6 from the control valve 3 has a first branch 7 to a downstream back-pressure regulator 8 in the form of a relief valve having a delivery outlet 9, and a second branch 10 leading to a permanently open orifice 11, beyond which is an exhaust outlet 12. The back-pressure regulator/relief valve 8 attempts to maintain a constant pressure at the permanently open orifice 11, by varying the flow to a delivery outlet 9.

When the needle valve 5 is completely closed, there is no flow through the delivery outlet 9. If the needle valve 5 is opened by a small amount, fluid flows through orifice 11 to exhaust outlet 12 but the back-pressure regulator/relief valve 8 remains closed and no fluid flows to outlet 9. Thus the backlash and non-linearity exhibited by most needle valves when in a slightly opening position, have no effect on the flow of fluid to the outlet 9.

Further opening of the needle valve 5 raises the pressure of fluid in branch 7 upstream of the back-pressure regulator/relief valve 8, which starts to open. The stability of very low flow rates through the outlet 9 is determined by the characteristics of the back-pressure regulator/relief valve 8, rather than those of the needle valve 5. As the needle valve 5 is opened further, the back-pressure regulator/relief valve 8 moves fully into its constant-pressure regime, and the flow through the exhaust 12 becomes effectively constant. Higher flow rates are then controlled directly by needle valve 5.

Figure 2:
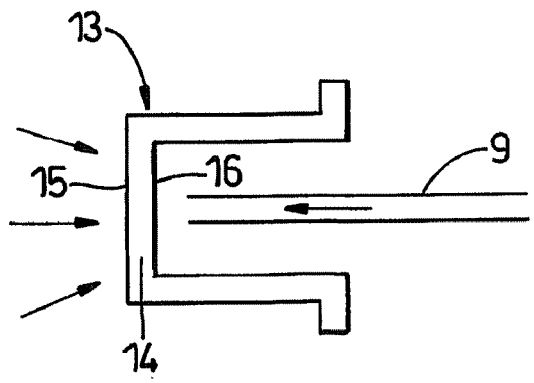
FIG. 2 illustrates diagrammatically a dewpoint meter for use in conjunction with the flow controller of FIG. 1.

In FIG. 2 is illustrated a glass thimble 13 forming part of a dewpoint monitor, the thimble 13 being mounted on a probe (not shown) in the conventional manner and inserted e.g. into a gas stack. The thimble 13 has an end wall 14 with a front surface 15 exposed to the flue gases the dewpoint of which is to be monitored, and a rear surface 16. Cooling air from the fluid flow controller 1 of FIG. 1 is supplied via outlet 9 and impinges on the rear surface 16 such that condensation is caused to form on the front surface 15.

Figure 3:
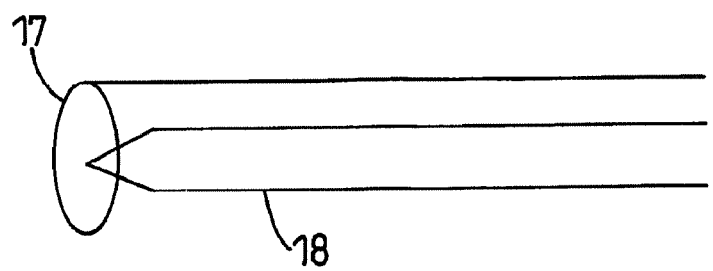
FIG. 3 illustrates diagrammatically a temperature monitoring method.

As indicated in FIG. 3, a circular platinum electrode 17 and a platinum/platinum 13% rhodium thermocouple 18 are embedded in the thimble 13, and connected to conventional control circuitry whereby both the temperature of the front surface 15 and the thickness of the condensate film formed on the front surface may be calculated, the conductance between the thermocouple 18 and the platinum electrode 17 giving a film thickness measurement, and the voltage of the thermocouple 18 giving the film temperature.

Figure 4:
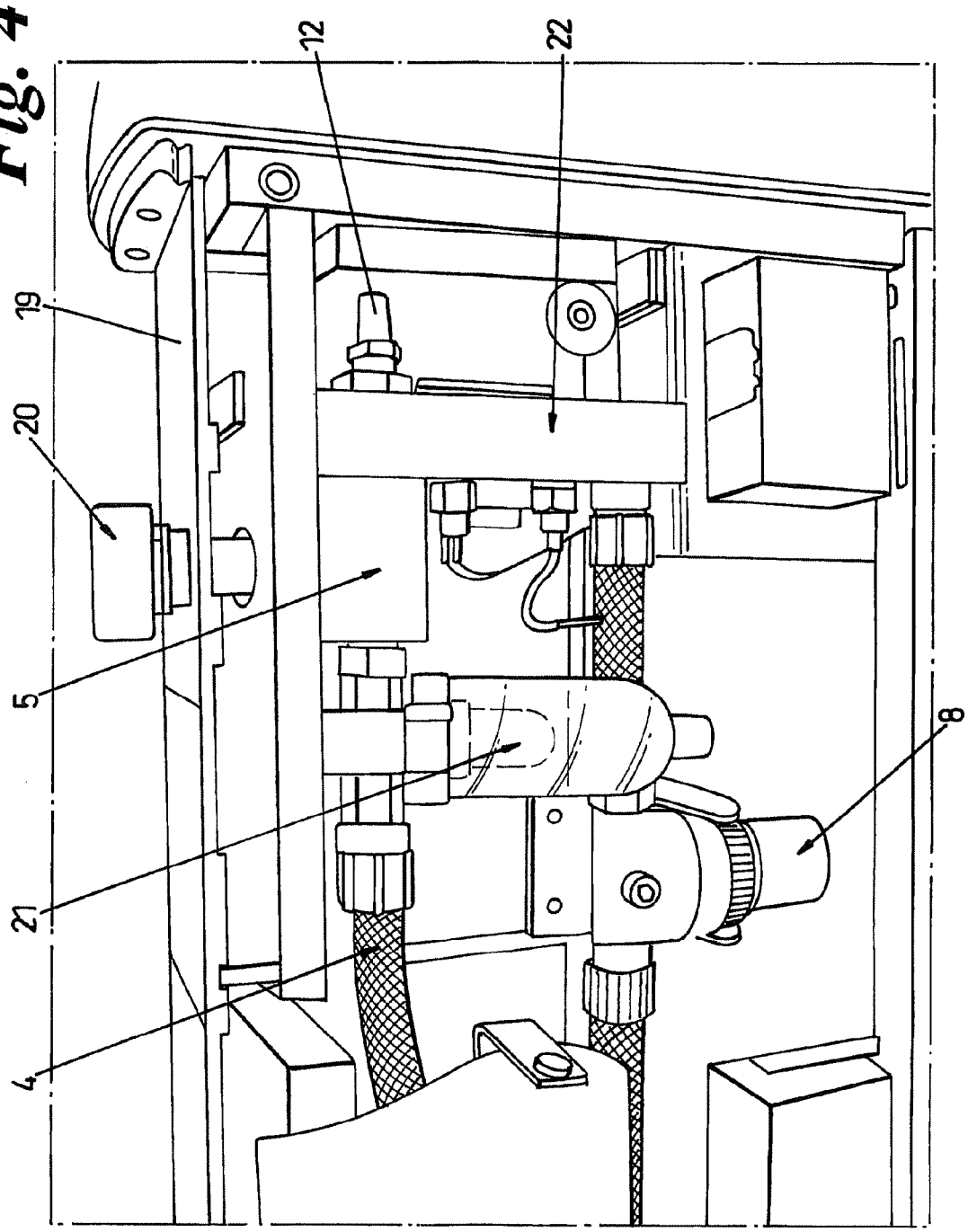
FIG. 4 illustrates an assembled flow controller in accordance with the invention.

The assembly of flow controller 1 illustrated in FIG. 4, comprises a casing 19, with an external flow control knob 20. Within the casing are also illustrated an air filter 21 and a manifold 22 with air flow rate sensors.

The flow controller 1 is ideal for the control of cooling air supply to a probe of a sulphuric acid dewpoint monitor. The pressure regulator 3 was set to deliver a pressure of 6 bar. The back-pressure regulator/relief valve 3 was set to deliver an air flow rate of 1 litre/min with the needle valve 5 open one full turn from closed. Precise control of air flow, over the range 0.1 to 350 L/min, was achieved.

Figure 5:
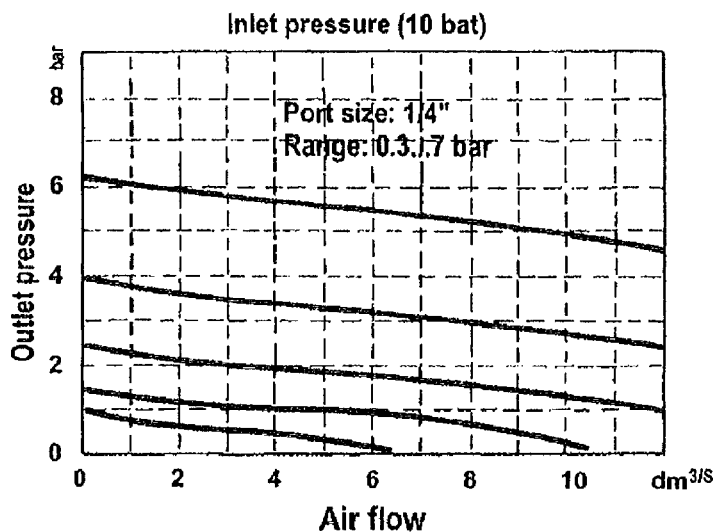
FIG. 5 illustrates a suitable pressure regular in accordance with the invention.

A suitable pressure regulator 3 is a Norgren R07, which has the characteristics shown in FIG. 5.

Figure 6:
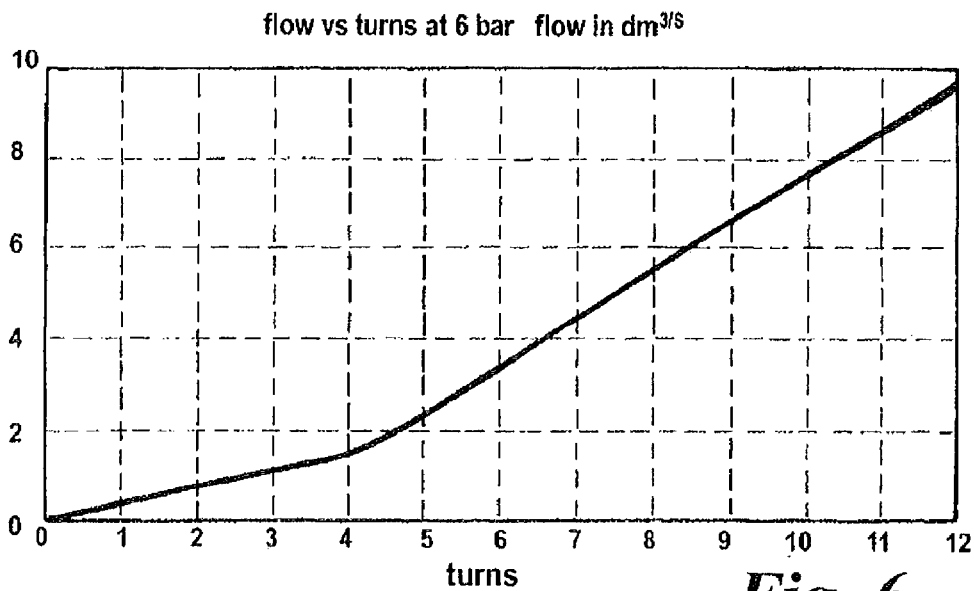
FIG. 6 illustrates a suitable control valve in accordance with the invention.

A suitable flow control valve 5 is a Norgren T1000C2800, which has the characteristics shown in FIG. 6.

Figure 7:
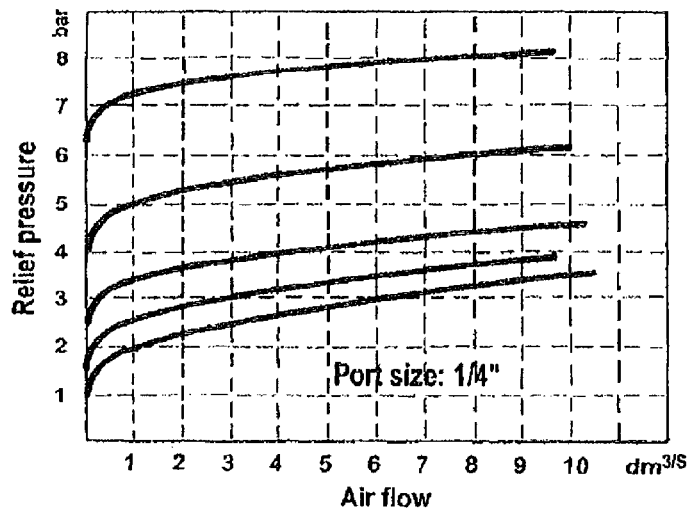
FIG. 7 illustrates a suitable relief valve in accordance with the invention.

A suitable relief valve 8 is a Norgren V07, which has the characteristics shown in FIG. 7.

The exhaust control orifice 12 is a 0.7 mm diameter hole, drilled through the exhaust fitting.

The invention claimed is:

1. A fluid flow controller comprising a variable aperture flow control valve, an inlet of said flow control valve adapted to receive fluid from a supply source and an outlet of said flow control valve to deliver fluid along a conduit, wherein a back-pressure regulator is located downstream of said flow control valve, said regulator, in turn, being adapted to deliver fluid to an outlet, while a permanently open orifice is connected to said conduit upstream of said back-pressure regulator and provided with an exhaust outlet, with characteristics of said flow control valve, of said back-pressure regulator and of said orifice being so selected that upon a slight opening of said flow control valve said back-pressure regulator maintains a closed condition, while further opening of said flow control valve raises the fluid pressure at said back-pressure regulator which commences opening, to provide a continuous exhaust flow at said exhaust outlet, to extend the operating range of said flow control valve down to relatively low flow rates.

2. A flow controller as claimed in claim 1, wherein a pressure regulator is located upstream of said flow control valve.

3. A flow controller as claimed in claim 1, wherein said flow control valve is a needle valve.

4. A flow controller as claimed in claim 1, wherein said back-pressure regulator is a relief valve.

5. A flow controller as claimed in claim 1, in combination with a dewpoint monitor.

6. A flow controller as claimed in claim 5, wherein said dewpoint monitor monitors film presence by means of conductivity.

7. A flow controller as claimed in claim 5, wherein said dewpoint monitor comprises a glass thimble with an embedded electrode and a thermocouple, said thimble having an end wall to one surface of which cooled air is delivered by said flow controller.

8. A flow controller as claimed in claim 7, wherein said electrode is a circular, platinum electrode.

9. A flow controller as claimed in claim 7, wherein said thermocouple is a platinum/platinum 13% rhodium thermocouple.

* * * * *